US006492487B1

(12) United States Patent
Yang et al.

(10) Patent No.: US 6,492,487 B1
(45) Date of Patent: Dec. 10, 2002

(54) PROCESS FOR MAKING REACTIVE UNSATURATED POLYESTER RESINS FROM 2-METHYL-1, 3-PROPANEDIOL

(75) Inventors: Lau S. Yang, Wilmington, DE (US); Edmund Baylis, Angy (FR); Patrice Gosset, Verneuil-en-Halatte (FR)

(73) Assignee: ARCO Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/946,326

(22) Filed: Sep. 5, 2001

(51) Int. Cl.$^7$ .............................................. C08G 63/02
(52) U.S. Cl. ....................................... 528/272; 528/271
(58) Field of Search ................................. 528/271, 272

(56) References Cited

U.S. PATENT DOCUMENTS

| | | | |
|---|---|---|---|
| 5,677,396 A | 10/1997 | Klang | 525/445 |
| 5,854,359 A | 12/1998 | Yang | 525/444 |
| 6,107,446 A | 8/2000 | Loza et al. | 528/272 |

OTHER PUBLICATIONS

J. Selley, "Unsaturated Polyesters," in *Kirk–Othmer, Encyclopedia of Chemical Technology* 4$^{th}$ ed. (1996) vol. 19, pp. 654–678.

S. Harris, "New Intermediates for Performance Polyesters: 2–Methyl–1,3–Propandediol," *Composites Institute of the SPI, 45$^{th}$ Annual Conference* (Feb. 12–15, 1990), reprint.

"MDPiol Glycol: Unsaturated Polyester Resin Technology," product brochure from ARCO Chemical Company (1991).

*Primary Examiner*—Terressa M. Boykin
(74) *Attorney, Agent, or Firm*—Jonathan L. Schuchardt

(57) ABSTRACT

A two-step process for making reactive unsaturated polyester resins is disclosed. First, an aromatic dicarboxylic acid derivative reacts with 2-methyl-1,3-propanediol (MPD) to produce an ester diol intermediate. The intermediate reacts with maleic anhydride and from about 15 to about 40 mole percent, based on the total glycol requirement, of propylene glycol. By shifting some glycol to the second step, and by using propylene glycol there, resin producers can easily make MPD-based UPR having a fumarate content greater than 85%. The resins give thermosets with improved physical properties, including excellent water resistance.

16 Claims, No Drawings

US 6,492,487 B1

PROCESS FOR MAKING REACTIVE UNSATURATED POLYESTER RESINS FROM 2-METHYL-1, 3-PROPANEDIOL

FIELD OF THE INVENTION

The invention relates to a process for making unsaturated polyester resins. In particular, the invention is a process for improving the reactivity of polyester resins based on 2-methyl-1,3-propanediol.

BACKGROUND OF THE INVENTION

Unsaturated polyester resins (UPR) are condensation polymers of glycols and aromatic dicarboxylic acid derivatives, particularly phthalic anhydride, isophthalic acid, or terephthalic acid. An unsaturated dicarboxylic acid derivative, usually maleic anhydride, is included to enable crosslinking of the resin with vinyl monomers, especially styrene.

Many glycols (e.g., ethylene glycol, propylene glycol, neopentyl glycol) have been incorporated into UPR. A welcome addition has been 2-methyl-1,3-propanediol (MPD), which became available in commercial quantities only within the last decade. MPD offers significant process advantages to resin producers because it is an easily handled liquid, it has a high boiling point, and it has two primary hydroxyl groups for rapid condensations.

Reactive resins are needed for environmentally demanding uses such as corrosion-resistant storage tanks and gel coats. Resin reactivity (with the crosslinking monomer) is linked to the content of maleic anhydride-derived fumarate groups in the resin. Resins with high fumarate contents (>85%) react faster and cure more thoroughly to give more highly crosslinked thermosets with better physical properties, particularly resistance to water or aqueous mixtures. Traditionally, high fumarate contents have been induced by preparing resins at high temperature or by heating resins to isomerize maleate groups to fumarates. Unfortunately, higher reaction temperatures inevitably produce resins with high color. For many applications, including gel coats and cultured marble, a resin with high color is unacceptable.

Polyester resins produced from MPD using conventional condensation polymerization have relatively low fumarate contents (60–70%), and simply increasing the reaction temperature to promote isomerization causes the color problems noted above. Ideally, resins with high reactivity could be made from MPD without the need for a high-temperature isomerization step.

In the case of UPR produced from terephthalic acid (or dimethyl terephthalate) and MPD, there is another problem. Styrene solutions of MPD-based terephthalate resins are usually cloudy. This turbidity is undesirable because it intereferes with thixotropic additives and causes sedimentation upon storage of the resin.

In sum, the UPR industry needs a better way to make reactive MPD-based unsaturated polyester resins, i.e., ones having fumarate contents greater than about 85%. Preferably, the process would provide resins that cure rapidly and thoroughly with vinyl monomers to give thermosets with an excellent balance of physical properties, especially good water resistance. Ideally, the process would provide these reactive resins while maintaining good clarity and low color, attributes that are valuable for gel coats, cultured marble, and other end-uses.

SUMMARY OF THE INVENTION

The invention is process for making reactive unsaturated polyester resins from 2-methyl-1,3-propanediol. The process comprises two steps. First, an aromatic dicarboxylic acid derivative reacts with 2-methyl-1,3-propanediol at a temperature within the range of about 175° C. to about 225° C. to produce an ester diol intermediate. In a second step, the intermediate reacts with maleic anhydride and from about 15 to about 40 mole percent, based on the total glycol requirement, of propylene glycol at a temperature within the range of about 185° C. to about 215° C. The resulting unsaturated polyester resin has a fumarate content greater than about 85%.

We surprisingly found that shifting a portion of the glycol to the second step of the process, and substituting propylene glycol for 2-methyl-1,3-propanediol in that second step, enable the preparation of unsaturated polyester resins having fumarate contents greater than 85%. The high fumarate content helps the resins cure quickly and thoroughly with vinyl monomers, giving the resulting thermosets excellent water resistance. Especially high fumarate contents are achieved using the "T5 method," in which the propylene glycol is added during the later stages of the second step, i.e., in the last hours of the polymerization. In sum, the invention provides a better way to make highly reactive, low-color, MPD-based unsaturated polyester resins.

DETAILED DESCRIPTION OF THE INVENTION

In the first step of the process of the invention, an ester diol intermediate is prepared by reacting 2-methyl-1,3-propanediol with an aromatic dicarboxylic acid derivative.

Suitable aromatic dicarboxylic acid derivatives are well known in the UPR industry, with their annual productions often measuring in the billions of pounds. They include at least one aromatic ring and two carboxy functional groups (acids, esters, acid halides, anhydride). Examples include unsubstituted and substituted phthalic anhydrides, isophthalic acids, terephthalic acids, dialkyl terephthalates, and the like. Particularly preferred, because of their low cost and commercial availability are phthalic anhydride, isophthalic acid, terephthalic acid, and dimethyl terephthalate. Suitable aromatic dicarboxylic acid derivatives also include recycled polyesters, especially thermoplastic polyesters such as polyethylene terephthalate (PET) or polybutylene terephthalate (PBT).

2-Methyl-1,3-propanediol (MPD) can be obtained from any suitable source. Commercially available MPD (sold as MPDiol® glycol by Lyondell Chemical Company) can be used in the process of the invention without further purification. The amount of MPD used is from about 1.4 to about 2.6 equivalents based on the amount of aromatic dicarboxylic acid derivative. A more preferred range is from about 1.6 to about 2.4 equivalents; most preferred is the range from about 1.9 to about 2.1 equivalents.

The aromatic dicarboxylic acid and MPD are reacted at a temperature within the range of about 175° C. to about 225° C. A more preferred range is from about 185° C. to about 215° C.; most preferred is the range from about 195° C. to about 210° C.

The reaction is conveniently performed by combining the reactants and heating until the condensation proceeds to the desired degree. Preferably, the reaction is performed under an inert atmosphere to minimize oxidative side-reactions. A steam-jacketed condenser (see Example 1) allows the waterof-reaction to evaporate but keeps glycols and molten aromatic dicarboxylic acid derivatives in the reactor.

Optionally, an esterification or transesterification catalyst is used in the first step to accelerate formation of the ester diol intermediate. This catalyst also facilitates further condensation in the subsequent reaction with maleic anhydride. The catalyst is often used to reduce the total reaction time required. Suitable esterification and transesterification catalysts are well known. Examples include organotin and organozinc compounds. Preferred organozinc compounds are zinc carboxylates such as zinc acetate, zinc propionate, or the like. Suitable organotin compounds are oxides, hydroxides, and mixed hydroxide oxides of tin. They include, for example, butyltin oxide hydroxide, dibutyltin oxide, phenyltin oxide hydroxide, and the like. A preferred catalyst is Fascat 4100, a product of Atochem, which is butyltin hydroxide oxide. When an esterification or transesterification catalyst is used, it is preferably used in an amount within the range of about 1 to about 5000 ppm, preferably from about 1 to about 500 ppm, based on the amount of finished polyester resin.

The esterification catalyst provides unanticipated benefits for MPD-terephthalates. For example, we produced an unsaturated terephthalate polyester resin with low color (APHA<100) and good clarity with butyltin oxide hydroxide as a catalyst (Example 1). Ideally, the resin will have no observable turbidity and will have an APHA color less than about 100, preferably less than about 90. These attributes are normally difficult to achieve when preparing a MPD-terephthalate resin (compare Examples 1 and 2, below). Moreover, the benefits are obtained while maintaining a high fumarate content.

An ester diol intermediate is the reaction product from the first step of the process. The intermediate is primarily a diester produced by esterification of the aromatic dicarboxylic acid derivative with two equivalents of the diol; higher oligomers are usually also present, however. The intermediate has a low content of free carboxylic acid groups. It has an acid number less than about 15 mg KOH/g, preferably less than about 10 mg KOH/g, and most preferably less than about 5 mg KOH/g. The intermediate preferably has little or no color. Preferably, the intermediate is cooled to a temperature in the range of about 140° C. to about 160° C. prior to adding maleic anhydride.

In the second step of the process, the intermediate reacts with maleic anhydride and propylene glycol. Maleic anhydride is used in an amount sufficient to impart good reactivity and crosslinkability to the polyester resin. Preferably, the molar ratio of maleic anhydride to aromatic dicarboxylic acid derivative will be within the range of about 0.5 to about 1.5. A more preferred range is from about 0.8 to about 1.2; most preferred is the range from about 0.9 to about 1.1.

In a conventional unsaturated polyester process, all of the glycol is added during the first step, and only maleic anhydride is added in the second step. In contrast, the process of the invention shifts a portion of the glycol required to the second step of the process. Thus, the amount of propylene glycol used in the second step is about 15 to about 40 mole percent, preferably about 20 to about 30 mole percent, based on the total glycol requirement. The "total glycol requirement" is the molar amount of glycol (or glycols) necessary to react with the aromatic dicarboxylic acid derivative and maleic anyhydride to produce a polyester resin having a predetermined $M_n$ (number average molecular weight), hydroxyl number, and acid number. Usually, however, an excess of glycol amounting to about a 1–10% molar excess over the total glycol requirement is used.

To illustrate: A conventional process might use 0.8 moles of terephthalic acid and 2.1 moles of MPD (all of the total glycol requirement) in step one, followed by 1.2 moles of maleic anhydride in step 2. Thus, the amount of glycol used here (2.1 moles) is a 5% molar excess over the number of moles of maleic anhydride plus terephthalic acid (2.0). In contrast, consider a typical process of the invention in which 0.8 moles of terephthalic acid and 1.6 moles of MPD (75% of the total glycol requirement) react in step one. In step two, the same 1.2 moles of maleic anhydride is used, but propylene glycol (0.5 moles, the remaining 25% of the total glycol requirement) is also added. Shifting glycol to the second step, and using propylene glycol instead of MPD, provide an unexpected boost in the fumarate content of the resin in this example from 70% to more than 90% (see Example 2 and Comparative Example 8, below).

After the maleic anhydride and propylene glycol are added in step two, the mixture is heated at a temperature within the range of about 185° C. to about 215° C., preferably from about 190° C. to about 210° C., and most preferably from about 195° C. to about 205° C., for a time effective to complete the polyesterification process, usually from about 5 to about 20 hours (typically 10–12 h). The resulting product is an unsaturated polyester resin having a fumarate content greater than 85%.

The fumarate content is expressed as the ratio of the number of fumarate groups to the combined total of fumarate+maleate groups in the resin. The fumarate content is determined by any suitable method, several of which are known in the art. In one preferred approach, a $^1$H NMR spectrum of the resin is obtained, and the relative intensities of signals arising from fumarate and maleate protons are compared and integrated. The signals are easy to identify because of their differing chemical shifts and the large coupling constant that is characteristic of the fumarate protons.

Unsaturated polyester resins made by the process of the invention have fumarate contents greater than about 85%. Preferably, the fumarate content is more than about 90%, and more preferably it is more than about 95%.

In one preferred process of the invention, hereinafter called the "T5 method," the propylene glycol is introduced, on a time basis, during the second half of the second reaction step. For example, if the second step requires 10 hours, then the propylene glycol is introduced at least 5 hours after the maleic anhydride addition. We surprisingly found that this delayed addition method provides even greater efficiency in generating fumarate groups. The benefit of the T5 method is best illustrated by comparing the results from Examples 1 and 6 or 7 below. As shown in these examples, simply delaying the addition of propylene glycol by 7 hours increases the fumarate content of the resin from 92% (Example 1) to 97% (Example 6) or 98% (Example 7)!

The ability to achieve such an efficient incorporation of fumarate groups is important because it allows formulators to either make more reactive resins with the same amount of maleic anhydride, or reduce the amount of maleic anhydride needed to produce a resin having desirable reactivity. Because maleic anhydride is a relatively expensive resin component, reducing the amount needed reduces the overall cost of the formulation.

The final acid number of the unsaturated polyester resin is typically in the range of about 15 to about 30 mg KOH/g. Immediately after preparation, the resin is preferably diluted with styrene to produce a solution that can be stored until it is needed. Preferably, the solution is clear and remains clear upon storage.

The unsaturated polyester resins are converted to thermosets according to methods that are well established. This usually involves reacting the resin with a vinyl monomer, preferably styrene, in the presence of a free-radical initiator. Suitable vinyl monomers and free-radical initiators are described in U.S. Pat. No. 5,677,396 ("the '396 patent"), the teachings of which are incorporated herein by reference. Typically, a resin mixture that contains vinyl monomer is combined with a free-radical initiator at room or elevated temperature, and is cured to give a solid product that can be post-cured if desired by heating at elevated temperature. The '396 patent includes examples that illustrate the preparation of polyester thermosets. The thermosets can include fillers, glass fibers, pigments, or other additives as is also described in the '396 patent.

Examples 1 and 2 below illustrate how the process of the invention is used to make a terephthalate polyester having a high (92%) fumarate content. The use of a tin esterification catalyst in Example 2 provides the added benefit of resin clarity. Examples 3–5 demonstrate the effectiveness of the process with a variety of aromatic dicarboxylic acid derivatives, including isophthalic acid (Example 3), recycled polyethylene terephthalate (Example 4), and dimethyl terephthalate (Example 5). As discussed earlier, Examples 6 and 7 show the advantage of delaying the addition of propylene glycol in step two. Comparative Examples 8 and 9 demonstrate that the conventional way of producing MPD-based unsaturated polyester resins (i.e., by adding all of the glycol in step one) gives resins with fumarate contents of about 70%.

As Table 1 (below) shows, the ability to make resins with high fumarate contents is valuable. The conventional approach (Comparative Example 8) yields a styrene-cured, MPD-terephthalate polyester thermoset having acceptable tensile strength, elongation, and flexural strength. However, thermosets from conventional resins cure less completely than those produced by the process of the invention. This is clear from inspection of the water boil test results. The conventional MPD-terephthalate fails to retain its flexural strength after immersion in boiling water, 5% aqueous KOH, or 5% aqueous HCl. In contrast, a resin produced by the process of the invention, especially one made with terephthalic acid (Example 1), exhibits excellent flexural strength retention.

The following examples merely illustrate the invention. Those skilled in the art will recognize many variations that are within the spirit of the invention and scope of the claims.

EXAMPLE 1

Preparation of a Reactive MPD-Terephthalate UPR

A two-liter reactor equipped with a mechanical stirrer, nitrogen inlet, and steam-jacketed condenser is charged with terephthalic acid (498 g), 2-methyl-1,3-propanediol (MPD, 540 g), and butyltin hydroxide oxide (Fascat 4100, product of Atochem, 150 mg). The mixture is heated to 210° C. for about 16 h. At the end of this period, the mixture is clear, almost colorless, and has an acid number of about 0.5 mg KOH/g. The reactor is cooled to 100–120° C. Maleic anhydride (445 g) and propylene glycol (144 g, 24 mole % based on total glycol) are added. The mixture is reheated to 200° C. for 12 h. The final acid number is 20 mg KOH/g. The product is cooled to 150° C. and blended with styrene to give a solution containing 60 wt. % of polyester in styrene. $^1$H NMR analysis of the resin reveals a fumarate content of 92%. The styrene solution remains clear upon storage.

EXAMPLE 2

Preparation of a Reactive MPD-Terephthalate UPR No Esterification Catalyst

A two-liter reactor equipped as described in Example 1 is charged with terephthalic acid (498 g) and MPD (540 g), but no tin catalyst is added. The mixture is heated to 210° C. for about 18 h. At the end of this period, the mixture is clear, pale yellow, and has an acid number of about 10 mg KOH/g. The reactor is cooled to 100–120° C. Maleic anhydride (445 g) and propylene glycol (144 g, 24 mole % based on total glycol) are added. The mixture is reheated to 200° C. for 12 h. The final acid number is 20 mg KOH/g. The product is cooled to 150° C. and blended with styrene to give a solution containing 60 wt. % of polyester in styrene. Fumarate content of the resin: 92%. The styrene solution becomes cloudy after a few days of storage.

EXAMPLE 3

Preparation of a Reactive MPD-Isophthalate UPR

A two-liter reactor equipped as in Example 1 is charged with isophthalic acid (498 g) and MPD (425 g). The mixture is heated to 210° C. for about 2 h. At the end of this period, the mixture is clear, colorless, and has an acid number of about 10 mg KOH/g. The reactor is cooled to 100–120° C. Maleic anhydride (298 g) and propylene glycol (119 g, 25 mole % based on total glycol) are added. The mixture is reheated to 200° C. for 13 h. The final acid number is 19 mg KOH/g. The product is cooled to 150° C. and blended with styrene to give a solution containing 60 wt. % of polyester in styrene. Fumarate content of the resin: 96%. The styrene solution remains clear upon storage.

EXAMPLE 4

Preparation of a Reactive MPD-Terephthalate UPR Using Recycled PET as the Aromatic Diacid Source A two-liter reactor equipped as in Example 1 is charged with recycled polyethylene terephthalate (PET) pellets (768 g), MPD (360 g), and zinc acetate (160 mg). The mixture is heated to 210° C. for about 6 h. At the end of this period, the mixture is slightly yellow. The reactor is cooled to 100–120° C. Maleic anhydride (588 g) and propylene glycol (190 g, 38 mole % based on total glycol) are added. The mixture is reheated to 200° C. for 12 h. The final acid number is 30 mg KOH/g. The product is cooled to 150° C. and blended with styrene to give a solution containing 60 wt. % of polyester in styrene. Fumarate content of the resin: 96%.

EXAMPLE 5

Preparation of a Reactive MPD-Terephthalate UPR using DMT as the Aromatic Diacid Source A two-liter reactor equipped as in Example 1 is charged with dimethyl terephthalate (DMT, 388 g), MPD (362 g), and zinc acetate (150 mg). The mixture is heated to 210° C. for about 6 h. At the end of this period, the mixture is clear, colorless, and has an acid number of about 0 mg KOH/g. The reactor is cooled to 100–120° C. Maleic anhydride (295 g) and propylene glycol (95 g, 24 mole % based on total glycol) are added. The mixture is reheated to 200° C. for 12 h. The final acid number is 19 mg KOH/g. The product is cooled to 150° C. and blended with styrene to give a solution containing 60 wt. % of polyester in styrene. Fumarate content of the resin: 91%. The styrene solution remains clear upon storage.

EXAMPLE 6

Preparation of a Reactive MPD-Terephthalate UPR "T5 Method": Effect of Delayed Addition of PG This example illustrates the benefit of delaying the addition of propylene glycol until the later stages of the second step in the process of the invention.

A two-liter reactor equipped as in Example 1 is charged with terephthalic acid (498 g), MPD (540 g), and butyltin hydroxide oxide (Fascat 4100, 150 mg). The mixture is heated to 210° C. for about 16 h. At the end of this period, the mixture is clear, colorless, and has an acid number of about 0.5 mg KOH/g. The reactor is cooled to 100–120° C. Maleic anhydride (445 g, 1.2 moles per mole of terephthalic acid) is added, and the mixture is reheated to 200° C. for 7 h. Propylene glycol (144 g, 24 mole % based on total glycol) is added, and heating continues at 200° C. for 5 h. The final acid number is 20 mg KOH/g. The product is cooled to 150° C. and blended with styrene to give a solution containing 60 wt. % of polyester in styrene. Fumarate content of the resin: 97%.

EXAMPLE 7

Preparation of a Reactive MPD-Terephthalate UPR "T5 Method" using DMT and Reduced Maleic Anhydride Content A two-liter reactor equipped as in Example 1 is charged with dimethyl terephthalate (776 g), MPD (576 g), and zinc acetate dihydrate (200 mg). The mixture is heated to 210° C. for about 7 h. At the end of this period, the mixture is clear, colorless, and has an acid number of about 0 mg KOH/g. The reactor is cooled to 100–120° C. Maleic anhydride (392 g, 1.0 moles per mole of DMT) is added, and the mixture is reheated to 200° C. for 7 h. Propylene glycol (152 g, 24 mole % based on total glycol) is added, and heating continues at 200° C. for 5 h. The final acid number is 22 mg KOH/g. The product is cooled to 150° C. and blended with styrene to give a solution containing 60 wt. % of polyester in styrene. Fumarate content of the resin: 98%.

COMPARATIVE EXAMPLE 8

Conventional Preparation of MPD-Terephthalate UPR Uses MPD Only; All MPD Added in Step 1

A two-liter reactor equipped as described in Example 1 is charged with terephthalic acid (498 g) and MPD (708 g). The mixture is heated to 210° C. for about 18 h. At the end of this period, the mixture is clear, pale yellow, and has an acid number of about 10 mg KOH/g. The reactor is cooled to 100–120° C. Maleic anhydride (441 g) is added. The mixture is reheated to 200° C. for 12 h. The final acid number is 20 mg KOH/g. The product is cooled to 150° C. and blended with styrene to give a solution containing 60 wt. % of polyester in styrene. Fumarate content of the resin: 70%.

COMPARATIVE EXAMPLE 9

Conventional Preparation of MPD-Isophthalate UPR Uses MPD Only; All MPD Added in Step 1

A two-liter reactor equipped as described in Example 1 is charged with isophthalic acid (498 g) and MPD (567 g). The mixture is heated to 210° C. for about 2 h. At the end of this period, the mixture is clear, pale yellow, and has an acid number of about 25 mg KOH/g. The reactor is cooled to 100–120° C. Maleic anhydride (298 g) is added. The mixture is reheated to 200° C. for 10 h. The final acid number is 22 mg KOH/g. The product is cooled to 150° C. and blended with styrene to give a solution containing 60 wt. % of polyester in styrene. Fumarate content of the resin: 73%.

Preparation and Testing of Polyester Thermosets

Neat resin castings are prepared as described previously in U.S. Pat. No. 5,854,359 (Examples 1–5) and U.S. Pat. No. 5,880,225 (Example 26). The physical properties of the cured thermosets are determined using standard (ASTM) test methods. Tensile strength, modulus, and elongation are determined using ASTM D-638, Type 1. Flexural strength and flexural modulus: ASTM D-790. DTUL: ASTM D-648. The water boil test is performed by immersing a standard thermoset specimen in boiling water, 5% aqueous HCl, or 5% aqueous NaOH for 7 days, followed by physical property testing as described above. Results of the testing appear in Table 1.

TABLE 1

Properties of Polyester Resins and Thermosets

| Resin Ex. # | 1 | 3 | 4 | C8 |
|---|---|---|---|---|
| Aromatic acid | terephthalic acid | isophthalic acid | PET | terephthalic acid |
| Resin % fumarate | 92 | 96 | 96 | 70 |
| Maleic/aromatic (molar) | 1.5 | 1.0 | 1.5 | 1.5 |
| Thermoset Properties | | | | |
| Tensile strength (psi) | 9300 | 12500 | 10500 | 10000 |
| Tensile modulus (kpsi) | 466 | 530 | 465 | 460 |
| Elongation (%) | 3.7 | 4.2 | 3.0 | 3.7 |
| DTUL (° C.) | 120 | 91 | 110 | 117 |
| Flexural strength (psi) | 19000 | 22000 | 20000 | 19000 |
| Flexural modulus (kpsi) | 485 | 567 | 510 | 480 |
| Flexural strength retention | | | | |
| 7-day water boil (%) | 93 | 80 | 66 | failed |
| 7-day 5% KOH boil (%) | 93 | 88 | 89 | failed |
| 7-day 5% HCl boil (%) | 94 | 75 | 70 | failed |

The preceding examples are meant only as illustrations. The following claims define the invention.

We claim:
1. A process which comprises:
   (a) reacting an aromatic dicarboxylic acid derivative with from about 1.4 to about 2.6 equivalents of 2-methyl-1,3-propanediol at a temperature within the range of about 175° C. to about 225° C. to produce an ester diol intermediate having an acid number less than about 15 mg KOH/g; and
   (b) reacting the ester diol intermediate with maleic anhydride and from about 15 to about 40 mole percent, based on the total glycol requirement, of propylene glycol at a temperature within the range of about 185° C. to about 215° C. to produce an unsaturated polyester resin having a fumarate content greater than about 85%.
2. The process of claim 1 wherein the aromatic dicarboxylic acid derivative is selected from the group consisting of terephthalic acid and dimethyl terephthalate.

3. The process of claim 1 wherein the aromatic dicarboxylic acid derivative is isophthalic acid.

4. The process of claim 1 wherein about 1.9 to about 2.1 equivalents of 2-methyl-1,3-propanediol is used.

5. The process of claim 1 wherein step (a) is performed at a temperature within the range of about 195° C. to about 210° C.

6. The process of claim 1 performed in the presence of an esterification or transesterification catalyst.

7. The process of claim 6 wherein the aromatic dicarboxylic acid derivative is terephthalic acid, the esterification catalyst is butyltin hydroxide oxide, and the resulting unsaturated polyester resin, when dissolved in styrene at 60 wt. % resin, gives a clear solution.

8. The process of claim 1 wherein the amount of propylene glycol used is within the range of about 20 to about 30 mole percent based on the total glycol requirement.

9. The process of claim 1 wherein step (b) is performed at a temperature within the range of about 195° C. to about 205° C.

10. The process of claim 1 wherein the unsaturated polyester resin has a fumarate content greater than about 90%.

11. The process of claim 1 wherein the unsaturated polyester resin has an APHA color less than about 90.

12. The process of claim 1 wherein the propylene glycol is introduced, on a time basis, during the second half of reaction step (b).

13. The process of claim 12 wherein the molar ratio of maleic anhydride to aromatic dicarboxylic acid derivative is within the range of about 0.8 to about 1.2.

14. The process of claim 12 wherein the molar ratio of maleic anhydride to aromatic dicarboxylic acid derivative is about 1.2, and the unsaturated polyester resin has a fumarate content greater than about 90%.

15. The process of claim 12 wherein the molar ratio of maleic anhydride to aromatic dicarboxylic acid derivative is about 1.2, and the unsaturated polyester resin has a fumarate content greater than about 95%.

16. The process of claim 12 wherein the propylene glycol is introduced about 5 hours before the end of step (b).

\* \* \* \* \*